US009265047B2

(12) United States Patent
Mallik et al.

(10) Patent No.: US 9,265,047 B2
(45) Date of Patent: Feb. 16, 2016

(54) PROCEDURES TO ACTIVATE OPPORTUNISTIC RELAYS

(71) Applicant: QUALCOMM Incorporated, San Diego, CA (US)

(72) Inventors: Siddhartha Mallik, San Diego, CA (US); Naga Bhushan, San Diego, CA (US); Aleksandar Damnjanovic, Del Mar, CA (US); Kiran Somasundaram, San Diego, CA (US); Anastasios Stamoulis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 13/826,426

(22) Filed: Mar. 14, 2013

(65) Prior Publication Data

US 2013/0265896 A1    Oct. 10, 2013

Related U.S. Application Data

(60) Provisional application No. 61/620,332, filed on Apr. 4, 2012.

(51) Int. Cl.
  *H04W 72/08* (2009.01)
  *H04W 24/02* (2009.01)
  *H04W 84/04* (2009.01)

(52) U.S. Cl.
  CPC ............ *H04W 72/08* (2013.01); *H04W 24/02* (2013.01); *H04W 84/047* (2013.01)

(58) Field of Classification Search
  None
  See application file for complete search history.

(56) References Cited

U.S. PATENT DOCUMENTS

| 2004/0235489 A1 | 11/2004 | Kwon |
| 2008/0009241 A1 | 1/2008 | Do et al. |
| 2008/0108369 A1 | 5/2008 | Visotsky et al. |

(Continued)

FOREIGN PATENT DOCUMENTS

| EP | 1379033 A1 | 1/2004 |
| EP | 1734705 A2 | 12/2006 |

(Continued)

OTHER PUBLICATIONS

Bulakci O. et al., "Flexible Backhaul Resource Sharing and Uplink Power Control Optimization in LTE-Advanced Relay Networks," IEEE Vehicular Technology Conference (VTC Fall), 2011, pp. 1-6.

(Continued)

*Primary Examiner* — Faruk Hamza
*Assistant Examiner* — Alan Lindenbaum
(74) *Attorney, Agent, or Firm* — Patterson & Sheridan, LLP (57) ABSTRACT

Aspects of the present disclosure relate to techniques for activating opportunistic relays. A combination of uplink and downlink pilots may be used to switch on user equipment relays (UeNBs) in an effort to make more accurate measurements in an effort to enable handovers. According to aspects of the present disclosure, a relay may evaluate one or more channel conditions, determine whether or not to transmit downlink reference signals to a UE based on the evaluation, and transmit downlink reference signals to the UE based on the determination. According to aspects, a relay may determine a set of resources reserved for transmission of uplink pilots by UEs, monitor the set of resources to detect transmission of uplink pilots, and report, to an eNB, a power at which the uplink pilots were received.

40 Claims, 6 Drawing Sheets

(56) References Cited

U.S. PATENT DOCUMENTS

| | | |
|---|---|---|
| 2009/0285112 A1 | 11/2009 | Lee et al. |
| 2010/0002656 A1 | 1/2010 | Ji et al. |
| 2010/0069110 A1 | 3/2010 | Lee et al. |
| 2010/0157826 A1 | 6/2010 | Yu et al. |
| 2010/0322145 A1* | 12/2010 | Yu et al. .................. 370/315 |
| 2011/0222428 A1 | 9/2011 | Charbit et al. |
| 2012/0015662 A1* | 1/2012 | Zhang et al. ............... 455/445 |
| 2012/0087299 A1 | 4/2012 | Bhattad et al. |
| 2012/0287875 A1* | 11/2012 | Kim et al. .................. 370/329 |
| 2012/0320819 A1 | 12/2012 | Kim et al. |
| 2013/0003647 A1 | 1/2013 | Shen et al. |

FOREIGN PATENT DOCUMENTS

| | | |
|---|---|---|
| EP | 1892969 A1 | 2/2008 |
| EP | 2247143 A1 | 11/2010 |
| EP | 2403297 A1 | 1/2012 |
| WO | 2006034577 A1 | 4/2006 |
| WO | WO-2008011717 A1 | 1/2008 |
| WO | WO-2011039970 A1 | 4/2011 |

OTHER PUBLICATIONS

Damnjanovic A., et al., "UE's Role in LTE Advanced Heterogeneous Networks," IEEE Communications Magazine, LTE-Advanced and 4G Wireless Communications, Feb. 2012, pp. 164-176.

International Search Report and Written Opinion—PCT/US2013/031997—ISA/EPO—Nov. 4, 2013.

Partial International Search Report—PCT/US2013/031997—ISA/EPO—Jun. 20, 2013.

\* cited by examiner

PROCEDURES TO ACTIVATE OPPORTUNISTIC RELAYS

CROSS-REFERENCE TO RELATED APPLICATIONS

This application claims benefit of priority to U.S. Provisional Application Ser. No. 61/620,332, filed on Apr. 4, 2012, which is expressly incorporated by reference herein in its entirety.

TECHNICAL FIELD

Certain embodiments of the present disclosure generally relate to wireless communication and, more particularly, to techniques for activating opportunistic relays.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Some systems may utilize a relay base station that relays messages between a donor base station and wireless terminals. The relay base station may communicate with the donor base station via a backhaul link and with the terminals via an access link. In other words, the relay base station may receive downlink messages from the donor base station over the backhaul link and relay these messages to the terminals over the access link. Similarly, the relay base station may receive uplink messages from the terminals over the access link and relay these messages to the donor base station over the backhaul link.

SUMMARY

Certain aspects of the present disclosure provide a method for wireless communication by a relay. The method generally comprises evaluating one or more channel conditions, determining whether or not to transmit downlink reference signals to a user equipment (UE) based on the evaluation, and transmitting downlink reference signals to the UE based on the determination.

Certain aspects of the present disclosure provide a method for wireless communication by a relay. The method generally comprises determining a set of resources reserved for transmission of uplink pilots by user equipments (UEs), monitoring by the relays the set of resources to detect transmission of the uplink pilots, and reporting, to an eNB, power at which the uplink pilots were received.

Certain aspects of the present disclosure provide an apparatus for wireless communication by a relay. The apparatus generally includes means for evaluating one or more channel conditions, means for determining whether or not to transmit downlink reference signals to a user equipment (UE) based on the evaluation, and means for transmitting downlink reference signals to the UE based on the determination.

Certain aspects of the present disclosure provide an apparatus for wireless communication by a relay. The apparatus generally includes means for determining a set of resources reserved for transmission of uplink pilots by user equipments (UEs), means for monitoring the set of resources to detect transmission of the uplink pilots, and means for reporting, to an eNB, power at which the uplink pilots were received.

Certain aspects of the present disclosure provide an apparatus for wireless communication by a relay. The apparatus generally includes at least one processor and a memory coupled to the at least one processor. The at least one processor is generally configured to evaluate one or more channel conditions, determine whether or not to transmit downlink reference signals to a user equipment (UE) based on the evaluation, and transmit downlink reference signals to the UE based on the determination.

Certain aspects of the present disclosure provide an apparatus for wireless communication by a relay. The apparatus generally includes at least one processor and a memory coupled to the at least one processor. The at least one processor is generally configured to determine a set of resources reserved for transmission of uplink pilots by user equipments (UEs), monitor the set of resources to detect transmission of the uplink pilots, and report, to an eNB, power at which the uplink pilots were received.

Certain aspects of the present disclosure provide a computer-program product for wireless communication is provided. The computer-program product generally includes a non-transitory computer-readable medium having code stored thereon. The code is generally executable by one or more processors for evaluating one or more channel conditions, determining whether or not to transmit downlink reference signals to a user equipment (UE) based on the evaluation, and transmitting downlink reference signals to the UE based on the determination.

Certain aspects of the present disclosure provide a computer-program product for wireless communication is provided. The computer-program product generally includes a non-transitory computer-readable medium having code stored thereon. The code is generally executable by one or more processors for determining a set of resources reserved for transmission of uplink pilots by user equipments (UEs), monitoring the set of resources to detect transmission of the uplink pilots, and reporting, to an eNB, power at which the uplink pilots were received.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
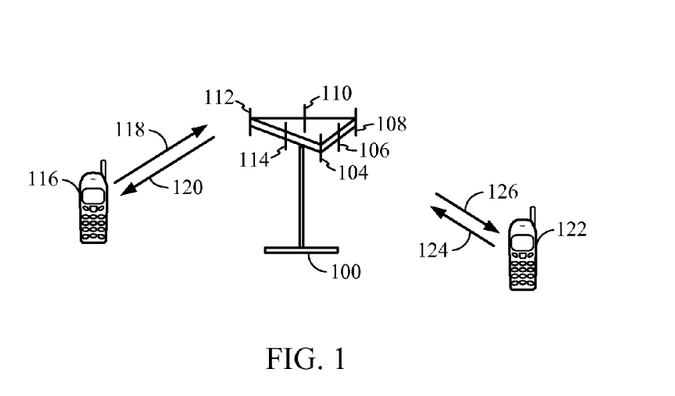
FIG. 1 illustrates a multiple access wireless communication system, according to aspects of the present disclosure.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
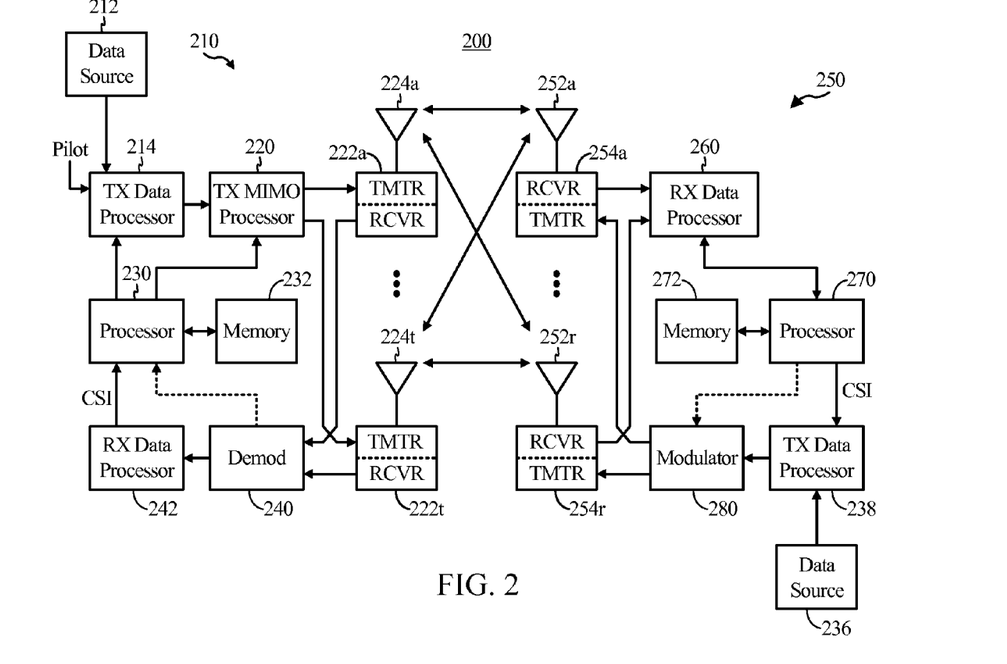
FIG. 2 is a block diagram of a communication system, according to aspects of the present disclosure.

FIG. 2 is a block diagram of an embodiment of a transmitter system 210 (also known as an access point) and a receiver system 250 (also known as an access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r, and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and then processes the extracted message.

In an aspect, logical channels are classified into Control Channels and Traffic Channels. Logical Control Channels comprise Broadcast Control Channel (BCCH), which is a DL channel for broadcasting system control information. Paging Control Channel (PCCH) is a DL channel that transfers paging information. Multicast Control Channel (MCCH) is a point-to-multipoint DL channel used for transmitting Multimedia Broadcast and Multicast Service (MBMS) scheduling and control information for one or several MTCHs. Generally, after establishing an RRC connection, this channel is only used by UEs that receive MBMS (Note: old MCCH+ MSCH). Dedicated Control Channel (DCCH) is a point-to-point bi-directional channel that transmits dedicated control information used by UEs having an RRC connection. In an aspect, Logical Traffic Channels comprise a Dedicated Traffic Channel (DTCH), which is a point-to-point bi-directional channel, dedicated to one UE, for the transfer of user information. Also, a Multicast Traffic Channel (MTCH) is a point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH), and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DL-SCH DownLink Shared CHannel
DM-RS DeModulation-Reference Signal
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RB Resource Block
RLC Radio Link Control
RRC Radio Resource Control
SAP Service Access Point
SDU Service Data Unit
SHCCH SHared channel Control CHannel
SN Sequence Number SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multimedia Broadcast Single Frequency Network
MCE MBMS Coordinating Entity
MCH Multicast CHannel
MSCH MBMS Control CHannel
PDCCH Physical Downlink Control CHannel
PDSCH Physical Downlink Shared CHannel
PRB Physical Resource Block
VRB Virtual Resource Block In addition, Rel-8 refers to Release 8 of the LTE standard.

Figure 3:
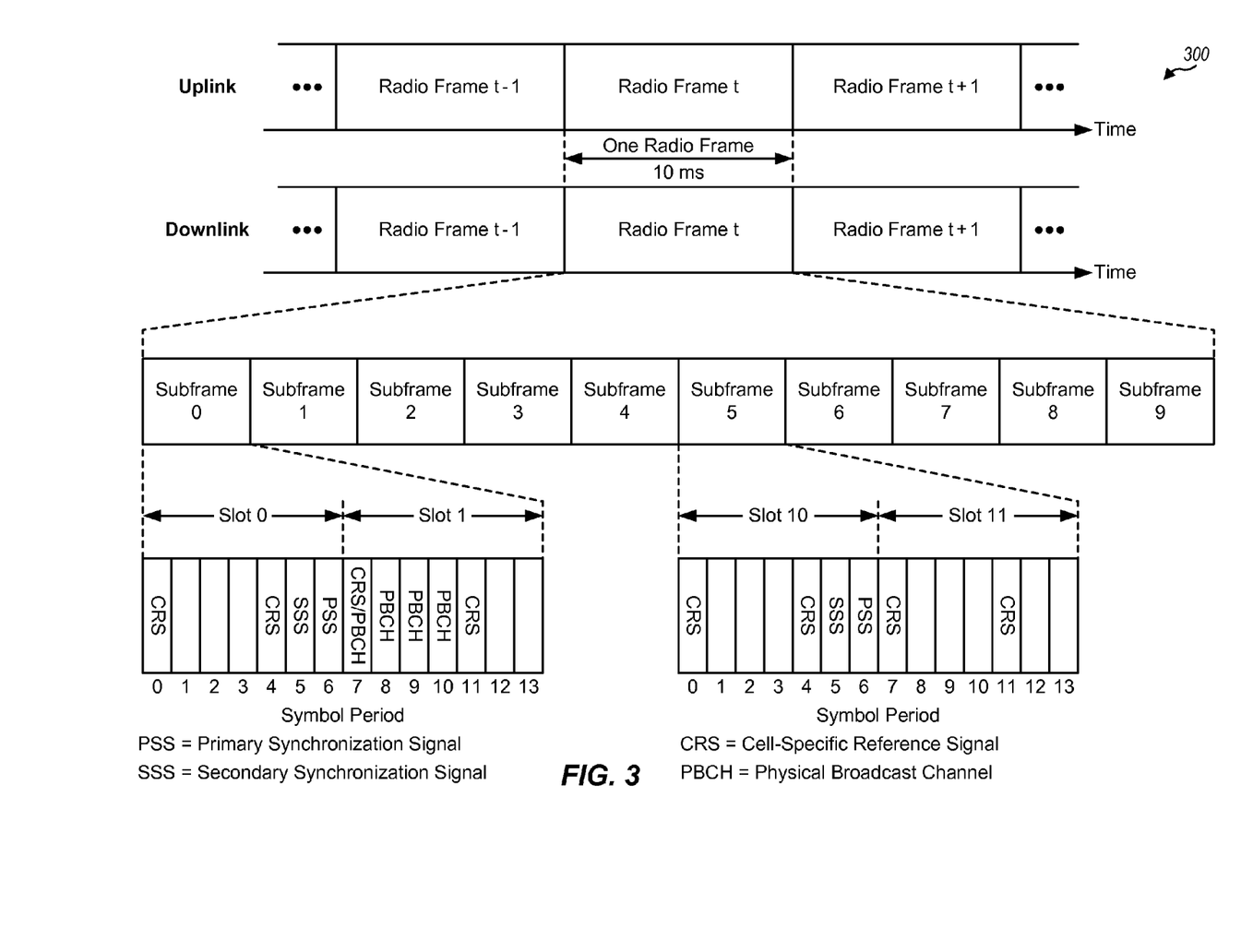
FIG. 3 illustrates an example frame structure, according to aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
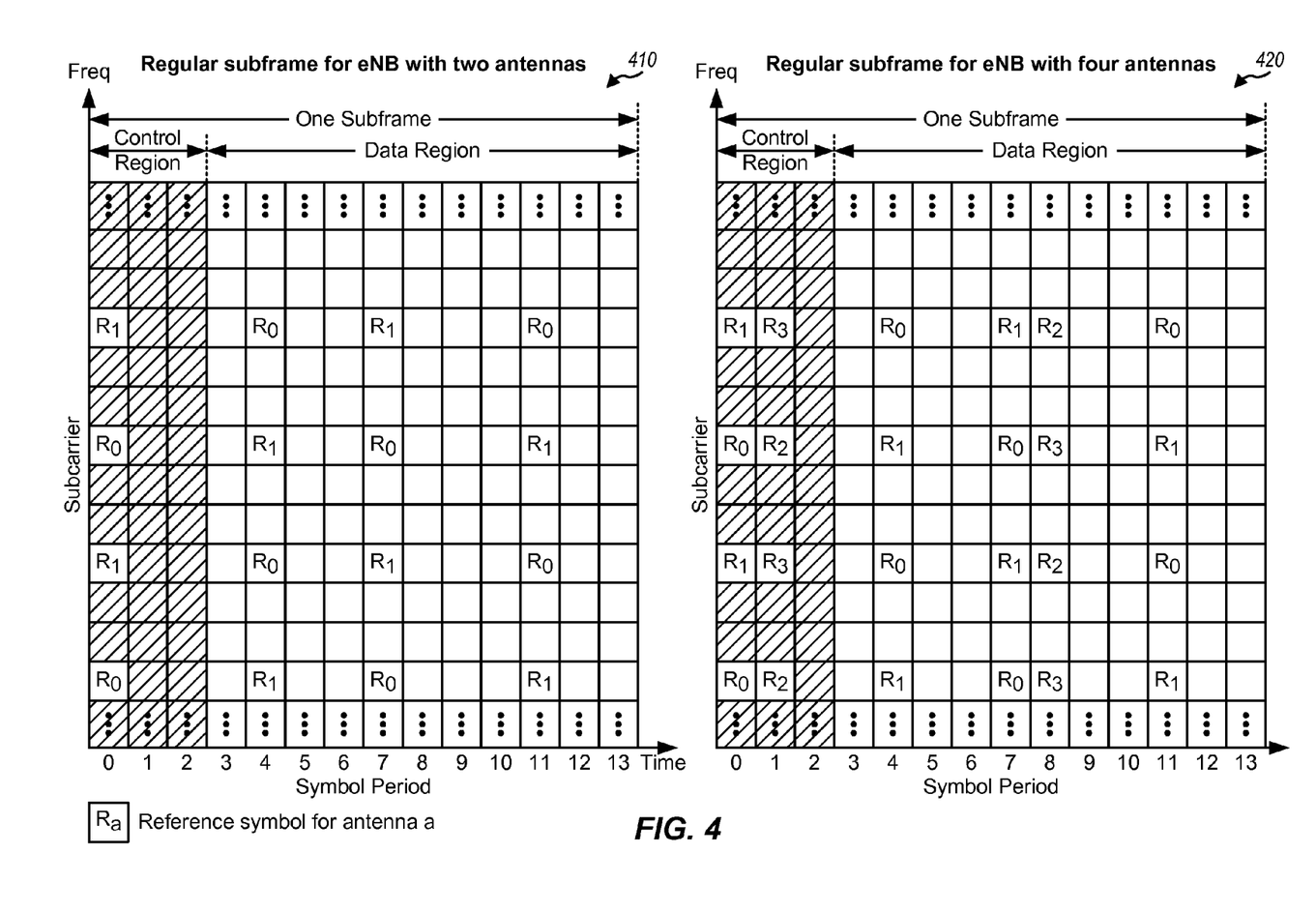
FIG. 4 illustrates an example subframe resource element mapping, according aspects of the present disclosure.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, ..., Q−1}.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple eNBs. One of these eNBs may be selected to serve the UE. The serving eNB may be selected based on various criteria such as received signal strength, received signal quality, path-loss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

An Example Relay System

Figure 5:
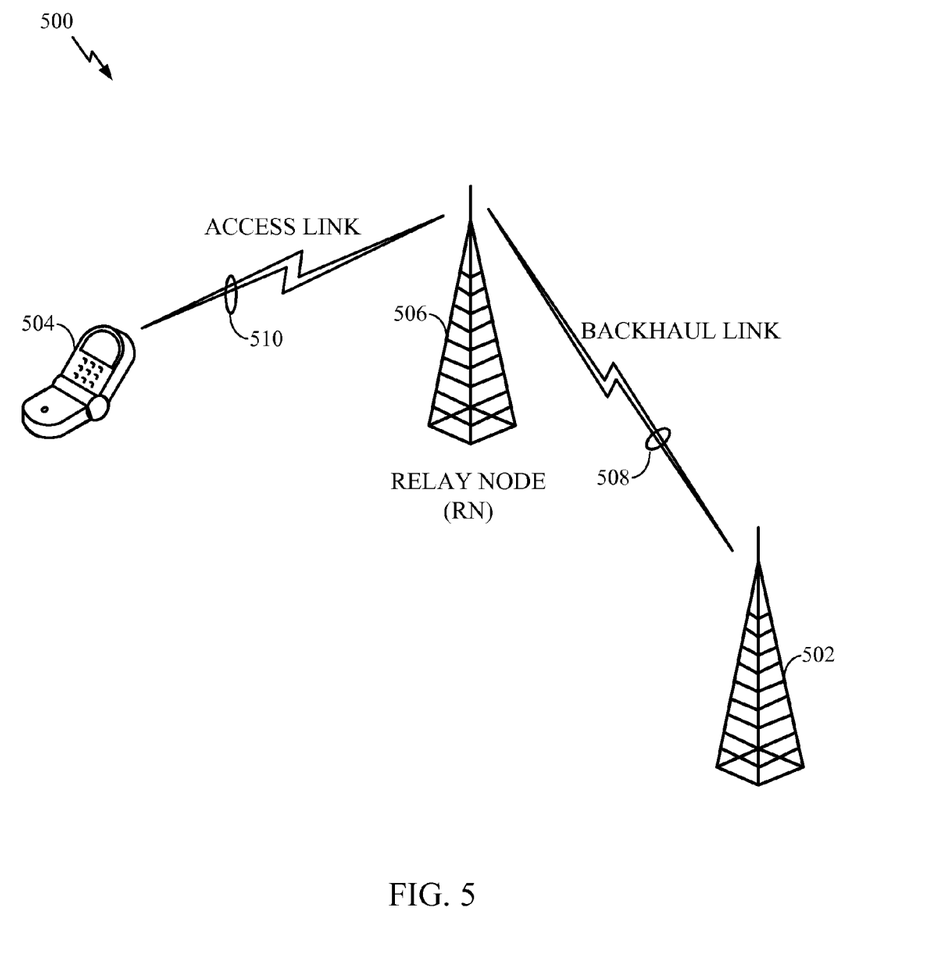
FIG. 5 illustrates an example wireless communication system, according aspects of the present disclosure.

FIG. 5 illustrates an example wireless system 500 in which certain aspects of the present disclosure may be practiced. As illustrated, the wireless system 500 includes a donor base station (BS) 502 that communicates with a user equipment (UE) 504 via a relay node (RN) 506. The RN 506 may communicate with the donor BS 502 via a backhaul link 508 and the relay node 506 may communicate with the UE 504 via an access link 510.

The RN 506 may receive downlink messages from the donor BS 502 over the backhaul link 508 and relay these messages to the UE 504 over the access link 510. RN 506 may, thus, be used to supplement a coverage area and help fill "coverage holes." According to certain aspects, a RN 506 may appear to a UE 504 as a conventional BS. According to other aspects, certain types of UEs may recognize a RN as such, which may enable certain features.

While the RN 506 is illustrated as a relay BS in FIG. 5, those skilled in the art will appreciate that the techniques presented herein may be applied to any type of device acting as a relay node including, for example, a user equipment (UE) acting as a relay between a donor base station and other UEs. As described herein, a UE acting as a relay node may be referred to as a UE relay (UeNB).

Procedures to Activate Opportunistic Relays

Certain cellular networks, including macro base stations with or without pico base stations, may have a dense deployment of inexpensive relays. The density of such relay deployment (e.g., 200 relays per cell) may far exceed the number of active UEs per cell. The measurement of the path loss between a UE and neighboring UE relays (UeNBs) may be necessary in an effort to determine whether the UE should be handed over from its serving eNB to a relay (e.g., UeNB).

In traditional cellular deployments, a UE may use downlink reference signals sent by macros, picos, and relays for respective path loss measurements. If all relays simultaneously broadcast LTE synchronization reference signals and downlink reference signals, pilot pollution may preclude UEs from making accurate reference signal received power (RSRP) measurements for path loss estimation.

A large fraction of relays are typically turned off (e.g., they are not serving any UEs) and may need to be turned on in an opportunistic manner when a UE may benefit by being off-loaded to a relay.

Thus, aspects of the present disclosure provide techniques using a combination of uplink and downlink pilots (and other waveforms) to opportunistically turn on UeNBs in an effort to make accurate measurements and enable handovers.

DL Pilots Transmitted by UeNBs

According to aspects, UEs may only use downlink pilots transmitted by UeNBs to measure path loss. UeNBs may transmit PSS/SSS and/or CRS. UEs may detect UeNBs using these transmitted signals and may measure path loss. However, severe pilot pollution may result from the large number of UeNB transmissions. As such, pilot collisions may be decreased by decreasing the frequency of PSS/SSS transmissions per UeNB (for example, decreasing the frequency from the LTE specification from 5 ms). Pilot collisions may also be decreased by UeNBs staggering transmissions of PSS/SSS.

Alternatively, pilot collisions may be decreased by UeNBs transmitting low-duty cycle channel state information reference signal (CSI-RS) transmissions instead of PSS/SSS transmissions. A CSI-RS periodicity of 5, 10, 20, 40, and 80 ms may be allowed according to certain LTE specifications. For each periodicity, a 1 ms offset may be possible. In addition, on a given subframe, up to 20 2Tx CSI-RS transmissions may be frequency multiplexed (i.e., there may be 20 CSI-RS configurations for 2Tx). However, detection of CSI-RS pilots by the UEs may be computationally less efficient as compared to detection of PSS/SSS.

CSI-RS Based Measurements

CSI-RS configurations may be a configuration of time-frequency resources that repeats in a periodic manner. The periodicity and subframe offset may be indicated by a CSI-RS subframe-configuration. There may be, for example, 80 unique subframe configurations with a periodicity of 80 ms. According to aspects of the present disclosure, a combination of CSI-RS configuration and CSI-RS subframe-configuration may be considered a CSI-RS signature.

The set of CSI-RS signatures used by UeNBs may be advertised by an eNB in a system information block (SIB). The CSI-RS signal sequence may be a pseudo-random sequence initialized with a seed that depends on a cell-ID. Accordingly, all UE relays under the same macro or pico cell may use the same signal sequence, since the signal sequence may depend on the macro or pico cell ID. This may reduce search complexity and help identify the donor eNB of the UeNB.

In an effort to keep the search complexity small, the number of signatures ($N_s$) may be limited, for example $N_s$=50. UeNBs may maintain synchronization with its serving macro or pico, and may pick a CSI-RS signature after a network listen. According to aspects of the present disclosure, all UeNB may broadcast their signatures all the time. After a network listen, the UeNB may inform the serving eNB of the UeNB's CSI-RS signature. According to aspects, a UeNB may detect a signatures used by one or more other UeNBs and may pick a CSI-RS signature that is not detected. Alternatively, instead of the UeNB selecting a CSI-RS signature after a network listen, the eNB may also assign signatures to UeNBs. According to aspects, a set of resources on the access link may be set aside for CSI-RS transmissions. For example, resources corresponding to CSI-RS signatures for all of the UeNBs on the access link may be set aside for CSI-RS transmissions.

UEs may utilize the CSI-RS transmissions to estimate path loss measurements. A UeNB may be identified via its CSI-RS configuration, and its donor eNB may be identified via the CSI-RS signal sequence. Path loss measurements may be reported to the serving eNB. The serving eNB may make a decision regarding handover of the UE. In making this decision, the serving eNB may map the CSI-RS configuration of the UeNB to the UeNB's identity.

Path Loss Measurements Using UL Pilots

According to aspects of the present disclosure, UeNBs may measure path loss measurements using uplink pilots transmitted by UEs. In this setup, a UeNB may not transmit downlink pilots unless it is connected to one or more UEs. While the use of a random access channel (RACH) preamble is presented in more detail herein, other uplink pilots such as sounding reference signals (SRS) may be used for path loss measurements made by UeNBs using a similar approach.

A set ($S_{detect}$) of resources may be set aside by the macro and/or pico for UEs to transmit uplink pilots. In Rel-10, physical random access channel (PRACH) resources may be semi-statically allocated within the PUSCH region and may be repeated periodically. A subset of these resources may be used for detection of UEs by UeNBs. For example, a particular RACH configuration may be advertised in a SIB as being reserved for the purpose of UeNBs detecting UEs.

One or more RACH signatures may be set aside for path loss measurements. The serving eNB of the UE may assign a dedicated signature to a UE and the serving eNB may request a RACH preamble transmission. This functionality already exists in Rel-8. For downlink data or a handover, the eNB may have the option of preventing contention by allocating a dedicated signature, resulting in contention-free access. Unlike Rel-10 RACH, a fixed transmission power may be used. Preamble power ramping may be configured.

Alternately, instead of a fixed power, a power offset with respect to a Rel-10 RACH transmit power may be configured. In Rel-10, the initial preamble transmission may be based on open-loop estimation with full compensation for path-loss. The serving eNB may infer the transmission power of RACH preamble when the UE is in a connected state and has reported RSRP values.

According to aspects of the present disclosure, UeNBs may monitor the set $S_{detect}$ of resources for RACH transmissions. UeNBs may report, to the serving eNB, the power at which different RACH signatures were received. RACH signatures may help identify the UE. The greater the RACH power, the greater the number of measurement reports that may need to be processed at the eNB.

The eNB may determine to handover a UE based on access path loss, backhaul geometry (link quality), and a direct link geometry of the UE (if the UE can be identified by the RACH signature). UeNBs may report measurements to only their donor eNBs. Thus, according to aspects of the present disclosure, the donor eNB may forward RACH measurement reports received from its UeNBs to neighboring eNBs.

Hybrid Scheme

In hybrid schemes, path loss measurements may be made using a combination of uplink and downlink pilots. As compared to downlink only schemes, hybrid schemes may have less pilot pollution, since not all UeNBs transmit pilots. As compared to uplink only schemes, the communication between the eNB and the UeNBs may be reduced.

According to aspects of the present disclosure, a UE may transmit an uplink pilot (e.g., choosing one out of many reserved RACH preambles) to enable UeNBs to detect the proximity of the UE by measuring the received power of the uplink pilot sequence. Without consulting donor eNBs, UeNBs that detect the transmission of an uplink pilot, may turn on downlink pilot transmissions (e.g. PSS/SSS or CSI-RS). The UeNBs may also start an activity timer.

UEs may use the received downlink pilot transmissions from UeNBs to make path loss measurements. The path loss measurements may be transmitted to the serving eNB, and the serving eNB may make a handover decision. If no UE is handed over to a UeNB by the time the activity timer expires, the UeNB may cease transmission of downlink pilots.

However, if all UeNBs that detect uplink pilots from a UE turn on simultaneously, situations may exist where downlink pilots transmitted by UeNBs may collide. Accordingly, a UE may not detect any UeNBs. According to aspects of the present disclosure, downlink pilot transmissions from UeNBs may be prioritized.

Prioritizing downlink pilot transmissions may be performed by setting a hard threshold on backhaul geometry to determine whether a UeNB should turn on and subsequently transmit downlink pilots.

According to aspects, a soft threshold may be set such that UeNBs with poor geometry may turn on with a lower probability as compared to those with higher geometry.

Downlink pilot transmission may be prioritized by having multiple uplink pilots. A specific pilot may be used by UeNBs with a backhaul geometry within a certain range. For example, multiple distinct uplink pilots may be used such that uplink pilot 1 may be used for geometry >20 dB, pilot 2 may be used for 15-20 dB, and pilot 3 may be used for 10-15 dB.

Another way to distinguish pilots may be to reserve different resources for different pilots. For example, an uplink pilot transmitted on pilot resource k, where k=1, 2, . . . 3, may indicate a request for backhaul geometries in a particular range.

According to aspects, the uplink pilot may encode (coarsely quantize) the direct link geometry of the UE, and all UeNBs whose backhaul geometries exceed the direct link geometry by a certain offset may switch themselves on.

Although aspects presented herein refer to CSI-RS as a specific example of downlink pilots that may be transmitted from a UeNB to UEs, UeNBs may transmit any reference signal. Thus, according to aspects of the present disclosure, a UeNB may evaluate one or more channel conditions, determine whether or not to transmit downlink reference signals to a UE based on the evaluation, and transmit downlink RSs to one or more UEs based on the determination.

Figure 6:
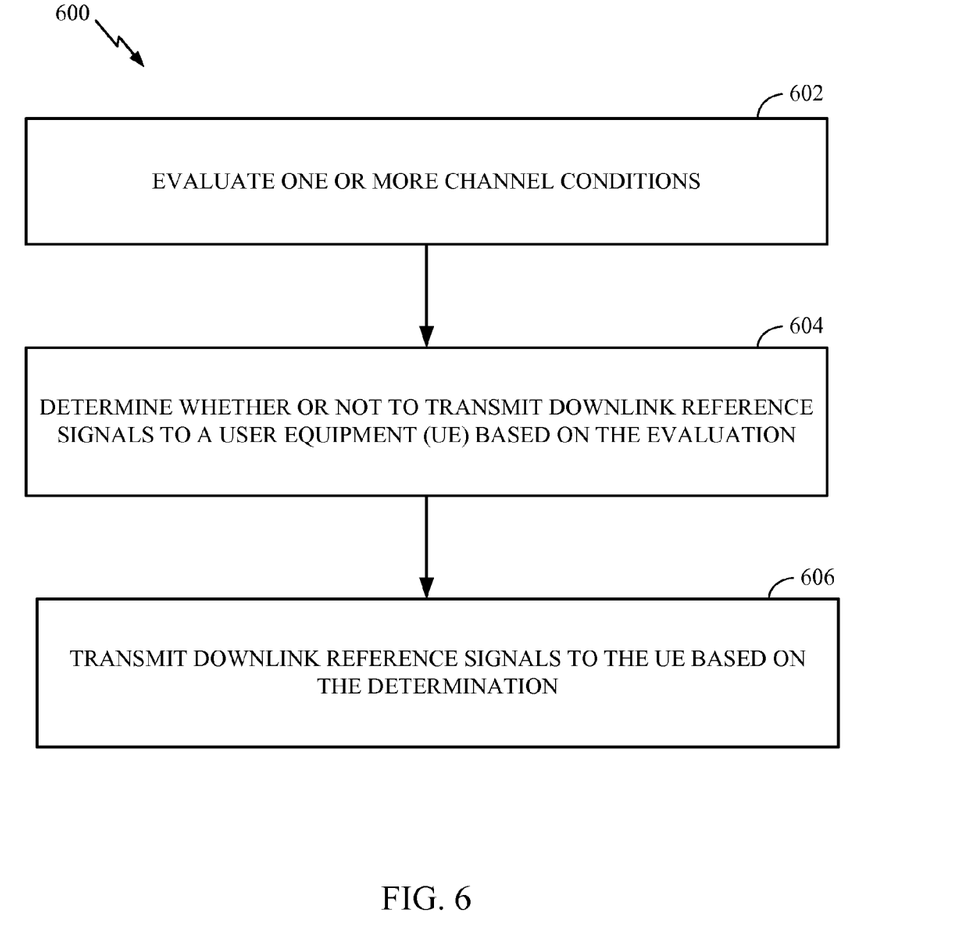
FIG. 6 illustrates example operations that may be performed by a UeNB, according to aspects of the present disclosure.

FIG. 6 illustrates example operations 600 performed, for example, by a relay. UeNB, according to aspects of the present disclosure. The operations may be performed by one or more modules of a UE relay including, for example, a processor, such as processor 270 in FIG. 2.

At 602, the relay may evaluate one or more channel conditions. At 604, the relay may determine whether or not to transmit downlink reference signals to a user equipment (UE) based on the evaluation. At 606, the relay may transmit downlink reference signals to the UE based on the determination.

As described above, the relay may evaluate at least one of link quality between the relay and the UE or evaluate link quality between the relay and a donor base station. Evaluating one or more channel conditions may involve evaluating link quality between the relay and the UE based on an uplink reference signal transmitted from the UE.

As described above, the relay may determine whether or not downlink reference signals are transmitted is based, at least in part, on a type of the uplink reference signal and link quality between the eNB and one or more relays.

According to aspects of the present disclosure, whether or not downlink reference signals are transmitted may be based, at least in part, on link quality of the UE and one or more relays and information regarding link quality of the UE and one or more relays is encoded in the uplink pilot.

A relay may transmit downlink reference signals to the UE if receive power of the uplink reference signal exceeds a threshold value. Transmitting downlink reference signals may include selecting a reference signal (RS) configuration, from a set of available RS configurations, limiting transmissions on resources corresponding to non-selected RS configurations, and transmitting RSs according to the selected RS configuration.

As described above, transmitting downlink reference signals may include transmitting channel state information RS (CSI-RS), each RS configuration comprising a CSI-RS signature that identifies a subframe and resources within the subframe for transmitting CSI-RS. The relay may determine the set of available RS configuration based on a SIB transmitted by an eNB.

The relay may select a RS configuration by detecting RS configurations selected by other relays and selecting an RS configuration that is not detected. The relay may inform an eNB of the selected RS configuration. Alternatively, the relay may receive an assigned RS configuration from an eNB.

According to aspects, the relay may initiate a timer in conjunction with transmitting downlink reference signals. The relay may cease transmission of downlink reference signals if the activity timer expires before handover of the UE to the relay.

Figure 7:
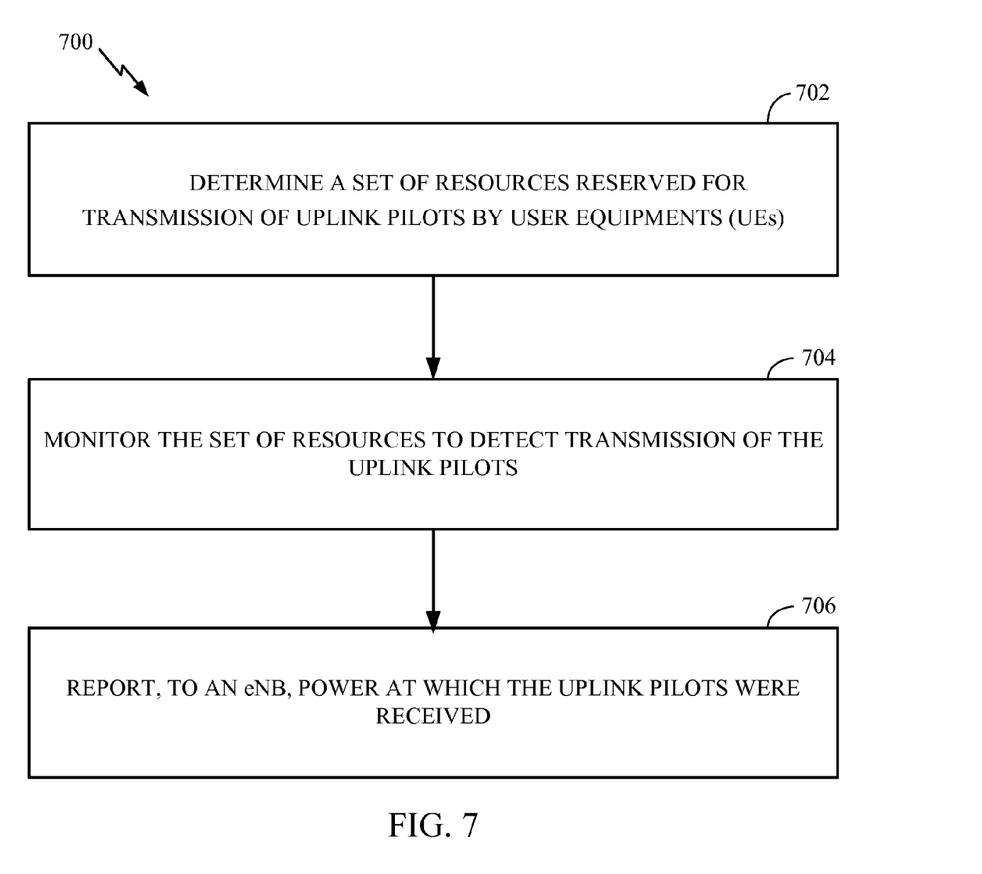
FIG. 7 illustrates example operations that may be performed by a UeNB, according to aspects of the present disclosure.

FIG. 7 illustrates example operations 700 performed, for example, by a relay UeNB. The operations may be performed by relay UE. The operations may be performed by one or more modules of a UE including, for example, a processor, such as processor 270 in FIG. 2.

At 702, the relay may determine a set of resources reserved for transmission of uplink pilots by user equipments (UEs). At 704, the relay may monitor the set of resources to detect transmission of the uplink pilots. At 706, the relay may report to an eNB, power at which the uplink pilots were received.

According to aspects, the relay may determine the set of resources reserved for transmission of uplink pilots based on a configuration of resources advertised in an SIB. The uplink pilots may include a RACH preamble or a SRS.

Thus, aspects presented herein provide techniques for activating opportunistic relays. As described above, a combination of uplink and downlink pilots may be used to opportunistically switch on UeNBs to enable more accurate measurements, in an effort to enable handovers.

The various operations of methods described above may be performed by any suitable combination of hardware and/or software component(s) and/or module(s).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communication by a relay, comprising:
    evaluating one or more channel conditions;
    determining whether or not to transmit downlink reference signals to a user equipment (UE) based on the evaluation; and
    transmitting downlink reference signals to the UE based on the determination, wherein the transmitting comprises:
        selecting a reference signal (RS) configuration that is not in use by another relay, from a set of available RS configurations, wherein the selecting comprises detecting RS configurations selected by other relays and selecting an RS configuration that is not detected;
        limiting transmissions on resources corresponding to non-selected RS configurations; and
        transmitting RSs according to the selected RS configuration.

2. The method of claim 1, wherein the evaluating comprises:
    evaluating at least one of link quality between the relay and the UE or link quality between the relay and a donor base station.

3. The method of claim 2, wherein the evaluating comprises:
    evaluating the link quality between the relay and the UE based on an uplink reference signal transmitted from the UE.

4. The method of claim 3, wherein the determining whether or not to transmit downlink reference signals is based, at least in part, on a type of the uplink reference signal and link quality between the donor base station and one or more relays.

5. The method of claim 3, wherein:
    the determining whether or not to transmit downlink reference signals is based, at least in part, on link quality of the UE and one or more relays; and
    information regarding the link quality of the UE and one or more relays is encoded in the uplink reference signal.

6. The method of claim 3, wherein the transmitting comprises:
   transmitting the downlink reference signals to the UE if receive power of the uplink reference signal exceeds a threshold value.

7. The method of claim 1, wherein the transmitting comprises:
   transmitting channel state information RS (CSI-RS), each RS configuration comprising a CSI-RS signature that identifies a subframe and resources within the subframe for transmitting CSI-RS.

8. The method of claim 1, further comprising:
   determining the set of-available RS configurations based on a system information block (SIB) transmitted by an evolved Node B (eNB).

9. The method of claim 1, further comprising informing an evolved Node B (eNB) of the selected RS configuration.

10. The method of claim 1, further comprising:
    initiating an activity timer in conjunction with transmitting downlink reference signals; and
    ceasing transmission of downlink reference signals if the activity timer expires before handover of the UE to the relay.

11. An apparatus for wireless communication by a relay, comprising:
    means for evaluating one or more channel conditions;
    means for determining whether or not to transmit downlink reference signals to a user equipment (UE) based on the evaluation; and
    means for transmitting downlink reference signals to the UE based on the determination, wherein the means for transmitting is configured to:
        select a reference signal (RS) configuration that is not in use by another relay, from a set of available RS configurations, by detecting RS configurations selected by other relays and selecting an RS configuration that is not detected;
        limit transmissions on resources corresponding to non-selected RS configurations; and
        transmit RSs according to the selected RS configuration.

12. The apparatus of claim 11, wherein the means for evaluating one or more channel conditions is configured to evaluate at least one of link quality between the relay and the UE or link quality between the relay and a donor base station.

13. The apparatus of claim 12, wherein the means for evaluating is configured to evaluate the link quality between the relay and the UE based on an uplink reference signal transmitted from the UE.

14. The apparatus of claim 13, wherein the means for determining whether or not to transmit downlink reference signals is based, at least in part, on a type of the uplink reference signal and link quality between the donor base station and one or more relays.

15. The apparatus of claim 13, wherein:
    the means for determining whether or not to transmit downlink reference signals is based, at least in part, on link quality of the UE and one or more relays; and
    information regarding the link quality of the UE and one or more relays is encoded in the uplink reference signal.

16. The apparatus of claim 13, wherein the means for transmitting is configured to transmit the downlink reference signals to the UE if receive power of the uplink reference signal exceeds a threshold value.

17. The apparatus of claim 11, wherein the means for transmitting is configured to:
    transmit channel state information RS (CSI-RS), each RS configuration comprising a CSI-RS signature that identifies a subframe and resources within the subframe for transmitting CSI-RS.

18. The apparatus of claim 11, further comprising:
    means for determining the set of available RS configurations based on a system information block (SIB) transmitted by an evolved Node B (eNB).

19. The apparatus of claim 11, further comprising:
    means for informing an evolved Node B (eNB) of the selected RS configuration.

20. The apparatus of claim 11, further comprising:
    means for initiating an activity timer in conjunction with transmitting downlink reference signals; and
    means for ceasing transmission of downlink reference signals if the activity timer expires before handover of the UE to the relay.

21. An apparatus for wireless communication by a relay, comprising:
    at least one processor configured to:
        evaluate one or more channel conditions;
        determine whether or not to transmit downlink reference signals to a user equipment (UE) based on the evaluation; and
        transmit downlink reference signals to the UE based on the determination, wherein the at least one processor is configured is configured to transmit by:
            selecting a reference signal (RS) configuration that is not in use by another relay, from a set of available RS configurations, wherein the selecting comprises detecting RS configurations selected by other relays and selecting an RS configuration that is not detected;
            limiting transmissions on resources corresponding to non-selected RS configurations; and
            transmitting RSs according to the selected RS configuration; and
    a memory coupled to the at least one processor.

22. The apparatus of claim 21, wherein the at least one processor is configured to evaluate one or more channel conditions by evaluating at least one of link quality between the relay and the UE or link quality between the relay and a donor base station.

23. The apparatus of claim 22, wherein the at least one processor is configured to evaluate the link quality between the relay and the UE based on an uplink reference signal transmitted from the UE.

24. The apparatus of claim 23, wherein the at least one processor is configured to determine whether or not to transmit the downlink reference signals is based, at least in part, on a type of the uplink reference signal and link quality between the donor base station and one or more relays.

25. The apparatus of claim 23, wherein:
    the at least one processor is configured to determine whether or not to transmit the downlink reference signals based, at least in part, on link quality of the UE and one or more relays; and
    information regarding the link quality of the UE and one or more relays is encoded in the uplink reference signal.

26. The apparatus of claim 23, wherein the at least one processor is configured to transmit the downlink reference signals to the UE if receive power of the uplink reference signal exceeds a threshold value.

27. The apparatus of claim 21, wherein the at least one processor is configured to transmit by:
  transmitting channel state information RS (CSI-RS), each RS configuration comprising a CSI-RS signature that identifies a subframe and resources within the subframe for transmitting CSI-RS.

28. The apparatus of claim 21, wherein the at least one processor is further configured to:
  determine the set of available RS configurations based on a system information block (SIB) transmitted by an evolved Node B (eNB).

29. The apparatus of claim 21, wherein the at least one processor is configured to:
  inform an evolved Node B (eNB) of the selected RS configuration.

30. The apparatus of claim 21, wherein the at least one processor is further configured to:
  initiate an activity timer in conjunction with transmitting downlink reference signals; and
  cease transmission of downlink reference signals if the activity timer expires before handover of the UE to the relay.

31. A computer-program product for wireless communication by a relay, the computer-program product comprising a non-transitory computer-readable medium having code stored thereon, the code executable by one or more processors for:
  evaluating one or more channel conditions;
  determining whether or not to transmit downlink reference signals to a user equipment (UE) based on the evaluation; and
  transmitting downlink reference signals to the UE based on the determination, wherein the code for transmitting comprises:
    code for selecting a reference signal (RS) configuration that is not in use by another relay, from a set of available RS configurations, wherein the code for selecting comprises code for detecting RS configurations selected by other relays and code for selecting an RS configuration that is not detected;
    code for limiting transmissions on resources corresponding to non-selected RS configurations; and
    code for transmitting RSs according to the selected RS configuration.

32. The computer-program product of claim 31, wherein the code for evaluating one or more channel conditions comprises code for evaluating at least one of link quality between the relay and the UE or link quality between the relay and a donor base station.

33. The computer-program product of claim 32, wherein the code for evaluating link quality between the relay and the UE is based on an uplink reference signal transmitted from the UE.

34. The computer-program product of claim 33, wherein the code for determining whether or not to transmit downlink reference signals is based, at least in part, on a type of the uplink reference signal and link quality between the donor base station and one or more relays.

35. The computer-program product of claim 33, wherein:
  the code for determining whether or not to transmit downlink reference signals is based, at least in part, on link quality of the UE and one or more relays; and
  information regarding the link quality of the UE and one or more relays is encoded in the uplink reference signal.

36. The computer-program product of claim 33, wherein the code for transmitting comprises code for transmitting the downlink reference signals to the UE if receive power of the uplink reference signal exceeds a threshold value.

37. The computer-program product of claim 31, wherein the code for transmitting comprises:
  code for transmitting channel state information RS (CSI-RS), each RS configuration comprising a CSI-RS signature that identifies a subframe and resources within the subframe for transmitting CSI-RS.

38. The computer-program product of claim 31, further comprising:
  code for determining the set of available RS configurations that are not in use by another relay based on a system information block (SIB) transmitted by an evolved Node B (eNB).

39. The computer-program product of claim 31, further comprising:
  code for informing an evolved Node B (eNB) of the selected RS configuration.

40. The computer-program product of claim 31, further comprising:
  code for initiating an activity timer in conjunction with transmitting downlink reference signals; and
  code for ceasing transmission of downlink reference signals if the activity timer expires before handover of the UE to the relay.

* * * * *